United States Patent

[11] 3,601,167

| [72] | Inventor | Hans Dolata<br>Waiblingen-Neustadt, Germany |
|---|---|---|
| [21] | Appl. No. | 762,405 |
| [22] | Filed | Sept. 25, 1968 |
| [45] | Patented | Aug. 24, 1971 |
| [73] | Assignee | Andreas Stihl Maschinenfabrik<br>Waiblingen-Neustadt, Germany |
| [32] | Priority | Sept. 27, 1967 |
| [33] | | Germany |
| [31] | | P 16 28 916.0 |

[54] MOTOR SAW CHAIN WITH COMPLETE TOOTH LINKS
1 Claim, 4 Drawing Figs.

| [52] | U.S. Cl. | 143/135 |
|---|---|---|
| [51] | Int. Cl. | B27b 33/14 |
| [50] | Field of Search | 143/135, 32 |

[56] References Cited
UNITED STATES PATENTS

| 2,850,057 | 9/1958 | Carlberg | 143/135 |
| 2,976,900 | 3/1961 | Mills | 143/135 |
| 3,036,606 | 5/1962 | Richardson | 143/135 |
| 3,189,064 | 6/1965 | Fredrickson | 143/135 |

*Primary Examiner*—Donald R. Schran
*Attorney*—Walter Becker

ABSTRACT: A tooth link for a motor saw chain which comprises a plate section having bores therethrough for receiving bolt means for the pivotal connection of the complete tooth link with other links of a motor saw chain, and a roof section merging with the respective adjacent outer lateral surface of the complete tooth link through a rounded longitudinal edge portion, said rounded portion extending over more than a quarter of a circle, said roof section having a cutting edge extending at least up to the laterally outermost mantle line of said rounded section.

PATENTED AUG 24 1971  3,601,167

Inventor:
Hans Dolata
By
Walter Becker

MOTOR SAW CHAIN WITH COMPLETE TOOTH LINKS

The present invention relates to a motor saw chain which comprises complete tooth links which are respectively provided with a roof-shaped cutting tooth, passing over a plate, for the connection with further chain links. The roof portion of said tooth which is thicker than the said plate has its front side provided with a cutting edge which is produced by grinding the back of said roof portion. The lateral surface of said tooth which is shaped in conformity with the surface of said plate is inclined toward the back of the roof away from the plate.

Heretofore known complete tooth links of chain saws of which the roof portion is considerably thicker, for instance twice as thick as the plate have a sharp longitudinal edge formed by surfaces arranged approximately rectangularly with regard to each other, said longitudinal edge forming the merging portion between the web and the roof portion of the tooth. A design of this character is disadvantageous because the tooth links will with each regrinding of the tooth back and the tooth face have to be machined separately.

It is, therefore, an object of the present invention to provide a motor saw chain with complete tooth links which will overcome the above-mentioned drawbacks.

It is another object of this invention to provide a motor saw chain with complete tooth links which can be reground in a simple manner, preferably fully automatically.

These and other objects and advantages of the invention will appear more clearly from the following specification in connection with the accompanying drawing, in which.

Figure 1:
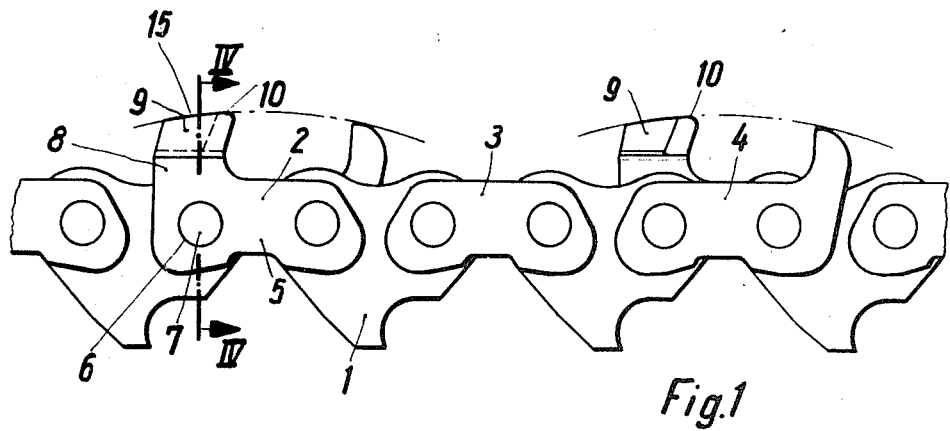
FIG. 1 is a side view of a motor saw chain with complete tooth links.

A motor saw chain having complete tooth links which are provided with a roof-shaped cutting tooth, passing over a plate, for the connection with further chain links while the roof portion which is thicker than the plate has a cutting edge obtained by grinding the back of the roof, whereas the outer lateral surface of said cutting tooth is inclined toward the back of the roof away from the plate, is, according to the present invention, characterized in that the back of the roof and the outer side surfaces of each complete tooth link merge with each other over a longitudinal edge which is rounded over more than a quarter of a circle, while the cutting edge of the roof portion extends at least to the laterally outermost mantle line of the rounded longitudinal edge. In this way, the complete tooth link may be reground in one working operation, for instance, by moving said complete tooth link past a stationary grinding stone along the back of the tooth to the cutting edge formed by the web portion of the link.

A saw chain comprising complete tooth links according to the invention can, in view of this design, be ground on the motor chain saw by means of a grinding device built into the saw while the roof and outer face edges of the complete tooth links can simultaneously be ground in one operation. A regrinding of the outer face edges by hand is therefore no longer necessary. The full automatic regrinding of the tooth links by a grinding device on the saw chain additionally yields the advantage that teeth with a higher degree of hardness may be employed because the employment of files which permit a regrinding only at a relatively low degree of hardening, will no longer be necessary.

According to a further feature of the invention, the inner longitudinal edge of the roof portion laterally protrudes beyond the plate by at least the thickness of the plate so that the roof portions of the complete teeth links which are alternately provided on opposite sides of the saw chain will, viewed in the cutting direction, form an uninterrupted continuous plate cutting edge with lateral rounded portions.

Referring now to the drawing in detail, the saw chain shown therein has a plurality of intermediate links 1 which are located one behind the other and are pivotally interconnected by means of complete tooth links 2, lashings 3, and depth limiting members 4. The complete tooth links 2 which are laterally linked to the intermediate links 1 are respectively located opposite a depth-limiting member 4. The complete tooth links 2 are arranged alternately on opposite sides of the intermediate links 1 while between each two complete tooth links 2 which follow each other in longitudinal direction there are provided two oppositely located lashings 3.

Figure 3:
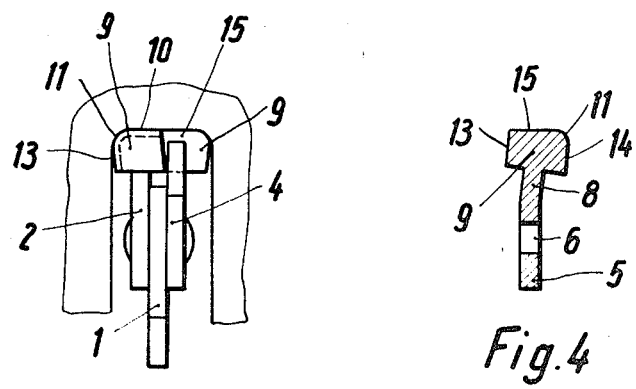
FIG. 3 is an end view of the saw chain in cutting direction of the latter.
Figure 4:
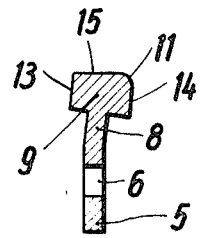
FIG. 4 is a section through a complete tooth link, said section being taken along the line IV—IV of FIG. 1.

For purposes of pivotally journaling the complete tooth links 2 on the intermediate links 1, the complete tooth links 2 each have a lateral plate section 5 with two serially arranged bores 6 for chain bolts 7. The plate section 5 merges with a laterally outwardly cranked web portion 8 which has a cutting tooth 9 protruding toward both sides. This cutting tooth 9 is provided with a cutting edge 10. The cutting edge 10 and the back 15 of the roof merge with the outer lateral surface 14 of the cutting tooth 9 by means of a longitudinal edge 11 which is rounded over more than a quarter of a circle. The outer surface 14 of the cutting tooth 9 is, in conformity with FIG. 3, inclined toward the rear as well as toward the plate section 5. The rounded longitudinal edge 11 extends in a direction counter to the cutting direction indicated by the arrow 12 toward the rear at an incline with regard to the longitudinal central plane of the saw chain at a slight angle.

In view of the rounded merging portion 11 between the cutting edge 10 and the outer lateral surface 14 of the cutting tooth 9, the complete tooth links 2 can at their roof and face edges be ground in one working operation at least up to the laterally outermost mantle line of the rounded longitudinal edge 11 so that a separate grinding is no longer necessary, and when a grinding device is built into the chain saw, also a regrinding by hand, for instance, by means of a file will become superfluous.

Figure 2:
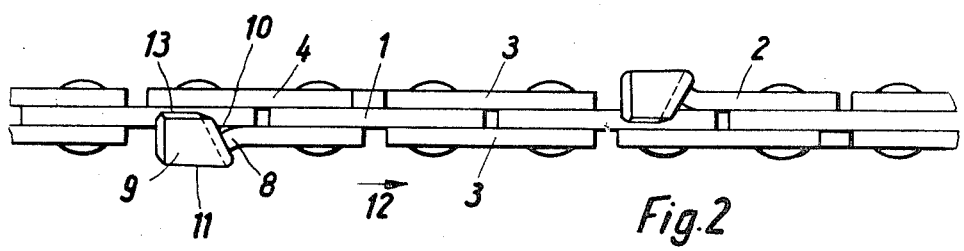
FIG. 2 is a top view of the motor saw chain of FIG. 1.

As shown in FIG. 2, the longitudinal edge 13 which is located opposite to the rounded longitudinal edge 11 is located in the plane of the intermediate links 1 while the inner longitudinal edge 13 of the cutting tooth 9 protrudes beyond the plate section 5 approximately by a distance equaling the thickness of the plate section 5 of the complete link 2 in such a way that the cutting edges 10 of successive complete tooth links 2 overlap each other when viewing in cutting direction indicated by the arrow 12.

It is, of course, to be understood that the present invention is, by no means, limited to the particular construction shown in the drawings, but also comprises modifications within the scope of the appended claims.

I claim:

1. A solid tooth link for a motor chain saw comprising: a plate section having bores therethrough for receiving bolt means for the pivotal connection of the complete tooth link at two spaced parallel pivotal axes to other links of a motor chain saw, and above the plate section a cutting tooth which is thicker than the plate section and has a front side which exhibits a cutting edge, a top surface which extends rearwardly and downwardly from the cutting edge, and an outer lateral surface which is inclined inwardly towards the back of the top surface merging therewith over a longitudinal corner rounded off over more than a quarter of a circle, the cutting edge of the tooth extending at least as far as the laterally outermost mantle line of said rounded-off corner, wherein, at least in the region of the cutting edge, the top surface of the tooth is curved convexly about an axis lying in a central plane located between said two pivotal axes and parallel to said two pivotal axes, said cutting edge lying in small-spaced depth-limiting relation to the intended direction of cutting, completely to the rear of said central plane.